United States Patent

[11] 3,558,909

[72] Inventor Marius A. Janson
Minneapolis, Minn.
[21] Appl. No. 839,588
[22] Filed July 7, 1969
[45] Patented Jan. 26, 1971
[73] Assignee Honeywell Inc.
Minneapolis, Minn.
a corporation of Delaware

[54] CONTROLLER SELECTIVELY PROVIDING AUTOMATIC OR MANUAL CONTROL
10 Claims, 1 Drawing Fig.

[52] U.S. Cl. .......... 307/116
[51] Int. Cl. .......... H01h 35/00
[50] Field of Search .......... 307/116, 117, 118, 112, 113, 114, 115; 318/(Inquired); 317/123, 131, 148.5; 340/258, 259, 243

[56] References Cited

UNITED STATES PATENTS 3,479,487 11/1969 Stoll .......... 307/116X

*Primary Examiner*—Robert K. Schaefer
*Assistant Examiner*—H.J. Hohauser
*Attorneys*—Lamont B. Koontz and Francis A. Sirr

ABSTRACT: A process controller selectively providing automatic or manual control of a process element, such as a load, in accordance with the magnitude of a controllable process variable, such as temperature. A three-position switch provides an automatic, a balance and a manual position. In the automatic position an error signal is applied to the noninverting input terminal of a first amplifier whose output controls the load. A differentiating reset feedback circuit connects the output of the first amplifier to the inverting input terminal of this amplifier. In the manual position a manual controller applies a variable voltage to the inverting input terminal of a second amplifier, the output of the first amplifier is connected to the noninverting input terminal of the second amplifier, and the output of the second amplifier is connected to the inverting input terminal of the first amplifier. A reset lockout circuit is controlled by the output of the first amplifier.

PATENTED JAN 26 1971 3,558,909
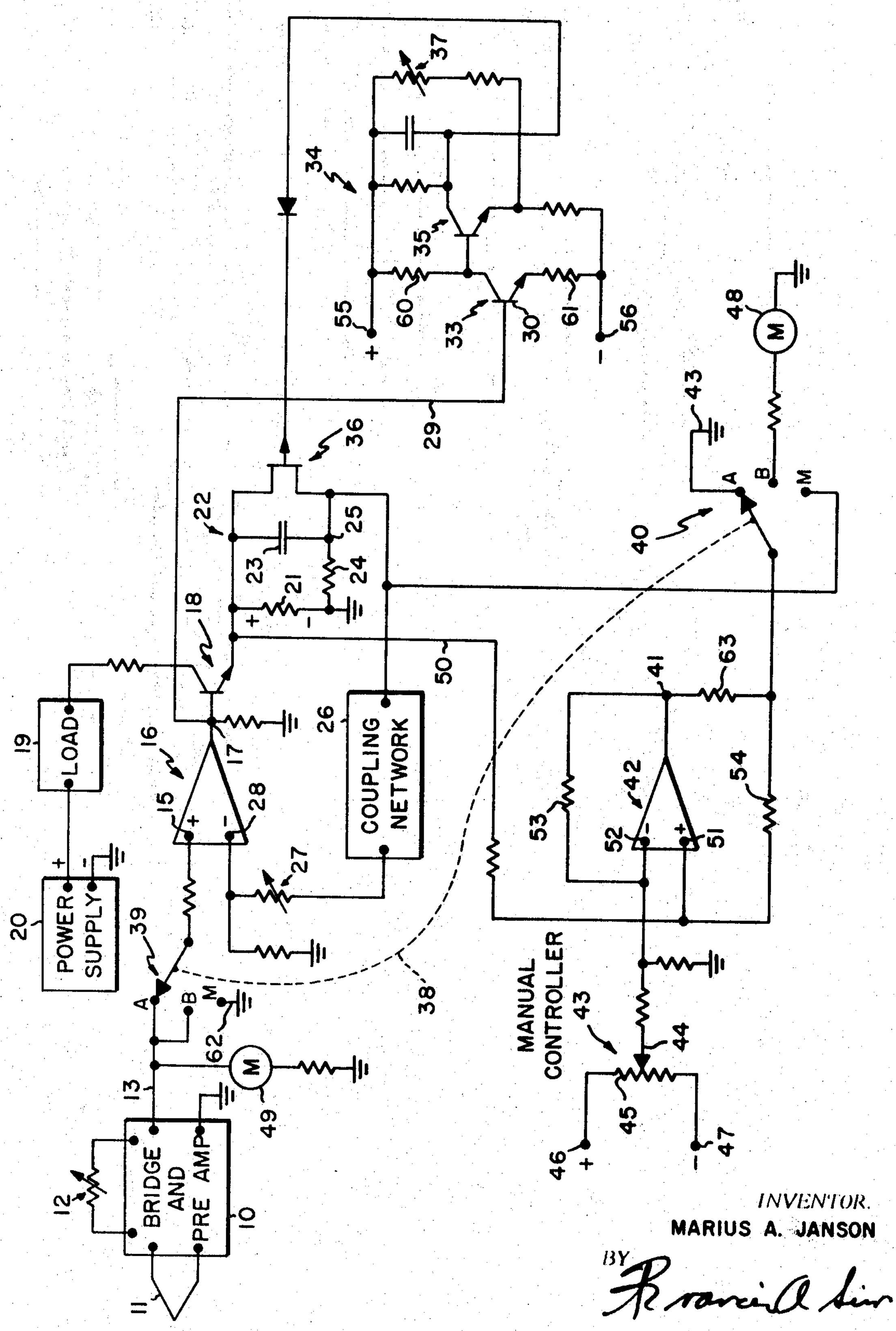
INVENTOR.
MARIUS A. JANSON
BY [signature]
ATTORNEY.

CONTROLLER SELECTIVELY PROVIDING AUTOMATIC OR MANUAL CONTROL

SUMMARY OF THE INVENTION

This invention relates to an improved means of achieving manual control of an output load, which load may also be controlled automatically. When the load is under automatic control, an error signal is applied to a first input terminal of a first amplifier whose output controls the load. A feedback circuit may be utilized to connect the output of the first amplifier to a second and an opposite type input terminal of the first amplifier, to provide reset or load compensation. When the load in under manual control, a second amplifier has a first input terminal connected to receive the output of the first amplifier, a manual control signal is applied to a second and an opposite type input terminal of the second amplifier, and the output of the second amplifier is connected to the second input terminal of the first amplifier. The invention requires that the second terminals of each amplifier be of the same type, either inverting or noninverting. A reset lockout amplifier, energized by the output of the first amplifier, may be utilized to prevent reset windup when the first amplifier output increases to a given level, as when the controller is operating outside of the proportional band.

BRIEF DESCRIPTION OF THE DRAWING

The single FIGURE is a schematic showing of the preferred embodiment of the invention.

DESCRIPTION OF THE PREFERRED EMBODIMENT

Referring to the single FIGURE bridge and preamplifier unit 10 receives an input voltage indicative of temperature from thermocouple 11, compares this voltage with a voltage indicative of a desired temperature as selected by setpoint potentiometer 12, and originates a direct current error signal of reversible polarity and variable magnitude on conductor 13 in accordance with deviation from the desired temperature. A meter 49 is connected to conductor 13 to measure the magnitude of the error signal.

As will be apparent, when the process controller is in the automatic mode of operation, this error signal is applied to noninverting input terminal 15 of first amplifier means 16. Output terminal 17 of amplifier 16 is connected to control the state of conduction of transistor 18. The collector-to-emitter output circuit of transistor 18 is connected in circuit with a load or process element 19 and a power supply 20. Also connected in circuit with elements 18, 19 and 20 is a resistor 21 having a voltage drop established thereacross, as indicated, which varies as a function of the current flowing through load 19.

Connected in parallel with resistor 21 is a circuit 22 which generates a reset or load compensation signal. Circuit 22 is a differentiating circuit including a capacitor 23 and a resistor 24. Junction 25 between capacitor 23 and resistor 24 is connected to the input of coupling network 26. The output of coupling network 26 is connected through a proportional band adjustment potentiometer 27 to inverting input terminal 28 of amplifier 16. Coupling network 26 is an impedance coupling network having a high input impedance and a low output impedance.

Since network 22 is a differentiating network and provides a reset signal whose magnitude decreases with time, the connection of terminal 25 to inverting input terminal 28 constitutes negative feedback. Should an integrating circuit be selected as a means of generating a reset signal, to replace circuit 22, then the reset signal from this integrating circuit is a signal whose magnitude increases with time, and this signal must be connected as positive feedback to an input of amplifier 16.

As above-mentioned, potentiometer 27 controls the proportional band or gain of the controller and, for purposes of explanation, this proportional band can be considered as a range of current flow through load 19 of from .5 milliamps to 5 milliamps.

Output terminal 17 of amplifier 16 is connected by way of conductor 29 to the input or base electrode 30 of transistor 33, this transistor being the input of a reset lockout means or amplifier 34. Reset lockout means 34 is constructed and arranged such that whenever the current through load 19 is outside of the range of .5 milliamps to 5 milliamps, transistor 35 becomes conductive and field effect transistor 36 becomes conductive to short capacitor 23 and eliminate reset windup or excessive charging of capacitor 23 as a result of the controller operating outside of its proportional band. Resistor 37 is provided to adjust the voltage level at terminal 17 at which reset lockout means 34 operates. Terminals 55 and 56 of reset lockout amplifier 34 are connected respectively to positive and negative sources of voltage, for example positive and negative 12 volts respectively. Resistors 60 and 61 are of approximately equal resistance value.

The mode of operation of the controller is controlled by switch means 38 having three-position switches 39 and 40. Switches 39 and 40 have an automatic position, designated as A, a manual position designated as M and a balance position located intermediate the automatic and manual positions and designated as B. Switch means 38 controls a first switching circuit when in the automatic position, a second switching circuit when in the manual position, and a third switching circuit when in the balance position.

Considering the automatic mode of operation, when switch means 38 is in its automatic position, as above-mentioned, the error signal at conductor 13 is connected to noninverting input terminal 15 of amplifier 16. Switch 40 when in the automatic position connects the output terminal 41 of a second amplifier 42 through resistor 63 to reference potential level 43. As will be apparent, second amplifier means 42 functions in cooperation with a manual controller 43 in the form of a potentiometer having a wiper 44, and having a resistance element 45 whose end terminals 46 and 47 are connected respectively to a positive source of voltage and a negative source of voltage, for example positive and negative 12 volts respectively. The output of amplifier 16, as that output appears at the upper terminal of resistor 21, is connected by means of conductor 50 to noninverting input terminal 51 of amplifier 42. Inverting input terminal 52 of amplifier 42 is connected to wiper 44 of potentiometer 43. Resistors 53 and 54 provide negative and positive feedback respectively from the output to the input of amplifier 42.

When switch means 38 is in its manual position, a second switching circuit connects input terminal 15 of amplifier 16 to reference potential level 62 through switch 39. Switch 40 connects output terminal 41 of amplifier 42 through coupling network 26 to input terminal 28 of amplifier 16.

When switch means 38 is in its balance position, a third switching circuit connects input terminal 15 of amplifier 16 to the error signal present on conductor 13 and also connects output terminal 41 of amplifier 42 to a meter 48.

As above-mentioned, by way of example, the proportional band of the controller provides a load current for load 19 which varies in the range of from .5 milliamps to 5 milliamps. As the load current varies through this range, the potential level of terminal 17 and base 30 of transistor 33 varies from −.4 volts to +1.6 volts, and the emitter of transistor 18 and thus the upper terminal of resistor 21 varies from −1 volt to +1 volt. As the voltage of base 30 decreases, transistor 33 comes out of saturation and when the voltage of base 30 is more negative than −.4 volts the collector of this transistor, and thus the base of transistor 35, becomes positive to the extent that transistor 35 and field effect transistor 36 are rendered conductive. As the voltage of base 30 increases, transistor 33 goes into saturation and when the voltage of base 30 is more positive than +1.6 volts the collector of this transistor, and thus the base of transistor 33, again becomes positive to the extent that transistor 35 and field effect transistor 36 are rendered conductive. Thus, transistor 35 and field effect transistor 36 are rendered conductive whenever the controller is operating outside of its proportional band.

The controller is shown in the single FIGURE operating in an automatic mode. When it is desired to change to the manual mode of operation, switch means 38 is actuated so that switches 39 and 40 stop in the balance position. Manual controller 43 is then adjusted until meter 48 reads zero current. Switch means 38 is then advanced to the manual position and bumpless control, whereby no disturbance is provided in the output current flowing to load 19, is achieved.

When it is desired to return from the manual mode of operation to the automatic mode of operation, setpoint potentiometer 12 is adjusted with switch means 38 in the manual position to produce a zero reading on meter 49. Switch means 38 is then advanced through the balance position to the automatic position and bumpless control is again achieved.

I claim:

1. In a process controller which is adapted to selectively provide automatic control or manual control of a process element; the controller having, error means adapted to respond to the magnitude of a controllable process variable to produce an error signal representative of deviation of the variable from a setpoint, and output means adapted to be connected to control the process element, the improvement comprising:

first amplifier means having an inverting type input terminal, a noninverting type input terminal, and an output terminal;

switch means having an automatic position and a manual position;

a first switching circuit including said switch means when in said automatic position connecting one input terminal of said first amplifier means to said error means;

second amplifier means having an inverting type input terminal, a noninverting type input terminal, and an output terminal;

circuit means connecting the output terminal of said first amplifier means to one of the input terminals of said second amplifier means;

manual controller means including a source of voltage having a variable output;

circuit means connecting the output of said manual controller to the other input terminal of said second amplifier means;

a second switching circuit including said switch means when in said manual position connecting the output terminal of said second amplifier means to the other input terminal of said first amplifier means;

said other input terminal of said first amplifier means and said other input terminal of said second amplifier means being of the same type; and circuit means connecting the output terminal of said first amplifier means to said output means.

2. A process controller as defined in claim 1 including a feedback circuit connecting the output terminal of said first amplifier means to said other input terminal of said first amplifier means.

3. A process controller as defined in claim 2 wherein said feedback circuit includes a resistor-capacitor network to provide reset feedback.

4. A process controller as defined in claim 3 including reset lockout means having an input connected to the output terminal of said first amplifier means and having an output connected to disable said reset feedback.

5. A process controller as defined in claim 3 wherein said reset feedback is a differentiating feedback and said other input terminal of said first amplifier means is the inverting type input terminal.

6. A process controller as defined in claim 1 wherein said switch means includes a balance position intermediate said automatic position and said manual position, and including a third switching circuit including said switch means when in said balance position connecting said one input terminal of said first amplifier means to said error means and connecting the output terminal of said second amplifier means to indicator means.

7. A process controller as defined in claim 6 wherein said first switching circuit includes means connecting the output terminal of said second amplifier means to a reference potential level when said switch means is in said automatic position, and wherein said second switching circuit includes means connecting said one input terminal of said first amplifier means to said reference potential level when said switch means is in said manual position.

8. A process controller as defined in claim 7 including a differentiating feedback circuit connecting the output terminal of said first amplifier means to said other input terminal of said first amplifier means, and wherein said other input terminal of said first amplifier means is the inverting type input terminal.

9. A process controller as defined in claim 8 including reset lockout means having an input connected to the output terminal of said first amplifier means and having an output connected to disable said reset feedback when the error signal reaches a given magnitude.

10. A process controller as defined in claim 9 including indicator means connected to indicate the magnitude of the error signal.